United States Patent
Murphy

(10) Patent No.: US 11,453,510 B1
(45) Date of Patent: Sep. 27, 2022

(54) APPARATUSES, SYSTEMS, AND METHODS FOR IMPROVED LANDING OF AERIAL VEHICLES

(71) Applicant: Opti-Logic Corporation, Tullahoma, TN (US)

(72) Inventor: Jonathan Murphy, Tullahoma, TN (US)

(73) Assignee: Opti-Logic Corporation, Tullahoma, TN (US)

( * ) Notice: Subject to any disclaimer, the term of this patent is extended or adjusted under 35 U.S.C. 154(b) by 433 days.

(21) Appl. No.: 16/797,664

(22) Filed: Feb. 21, 2020

(51) Int. Cl.
| | | |
|---|---|---|
| *B64D 43/00* | (2006.01) | |
| *B64D 45/08* | (2006.01) | |
| *B64B 1/00* | (2006.01) | |
| *B64C 39/02* | (2006.01) | |
| *B64D 45/00* | (2006.01) | |
| *G05D 1/10* | (2006.01) | |

(52) U.S. Cl.
CPC ............ *B64D 43/00* (2013.01); *B64D 45/08* (2013.01); *B64B 1/005* (2013.01); *B64C 39/024* (2013.01); *B64C 2201/022* (2013.01); *B64C 2201/024* (2013.01); *B64C 2201/04* (2013.01); *B64C 2201/18* (2013.01); *B64D 2045/008* (2013.01); *G05D 1/101* (2013.01)

(58) Field of Classification Search
CPC .. B64D 43/00; B64D 45/08; B64D 2045/008; B64B 1/005; B64C 39/024; B64C 2201/022; B64C 2201/024; B64C 2201/04; B64C 2201/18; G05D 1/101
See application file for complete search history.

(56) References Cited

U.S. PATENT DOCUMENTS

| | | | |
|---|---|---|---|
| 8,265,808 B2 | 9/2012 | Garrec et al. | |
| 8,996,207 B2 | 3/2015 | Goossen et al. | |
| 9,499,265 B2 * | 11/2016 | Sanz ..................... | H02J 7/0044 |
| 9,573,684 B2 | 2/2017 | Kimchi et al. | |
| 9,617,011 B2 | 4/2017 | Derenick et al. | |
| 10,109,208 B2 | 10/2018 | Cherepinsky et al. | |
| 10,534,372 B2 | 1/2020 | Fisher et al. | |
| 2010/0152933 A1 | 6/2010 | Smoot et al. | |

FOREIGN PATENT DOCUMENTS

| | | | | |
|---|---|---|---|---|
| WO | 2017053627 A1 | | 3/2017 | |
| WO | WO-2020079668 A1 * | 4/2020 | ........... | B23Q 9/0014 |
| WO | WO-2021170667 A1 * | 9/2021 | | |

* cited by examiner

Primary Examiner — Valentina Xavier
(74) Attorney, Agent, or Firm — Patterson Intellectual Property Law, P.C.

(57) ABSTRACT

A device attachable to an aerial vehicle that incorporates electronics to control sensor position data and verify safety of aerial vehicle landing area. The device may be easily attached to an existing aerial vehicle. The device monitors sensor data from one or more distance measuring sensors and pressure sensors to set an angle of incidence for the distance measuring sensors. This pressure sensor derived angle setting allows for a continual data mapping of the aerial vehicles landing area to enhance and improve the landing zone.

19 Claims, 5 Drawing Sheets

APPARATUSES, SYSTEMS, AND METHODS FOR IMPROVED LANDING OF AERIAL VEHICLES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

None

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure relates generally to apparatuses, systems, and methods for providing improved landing of aerial vehicles.

The present disclosure generally relates to aerial vehicles and more particularly to vertical take-off and landing vehicles such as, but not limited to, helicopters, unmanned aerial vehicles (UAVs), blimps, balloons, and drones to aide in the safety of landing said vehicles.

In the area of aerial vehicle landing, it is common that obstructions may lie between the aerial vehicle and a landing area that is safe for the vehicle to land on. This situation is particularly dangerous for aerial vehicles in low light conditions, such as dusk, twilight, nighttime, etc. During these low light condition landings, it is valuable to know any of the obstructions between the aerial vehicle and the landing area.

BRIEF SUMMARY

Embodiments of the present disclosure provide apparatuses, systems, and methods for providing improved landing of aerial vehicles. It is an object of the present invention to provide a new and improved method of landing data collection that allows safer landing for aerial vehicles.

A device according to aspects of the present disclosure may attach to an aerial vehicle. The device may include one or more electronic components to control sensor position data and to verify safety of an aerial vehicle landing area. The device may be configured to monitor sensor data from one or more distance measurement devices and at least one pressure sensor to set an angle of incidence for at least one of the distance measurement sensors. An angle setting may be derived from a value obtained by at least one pressure sensor to allow for continual data mapping of the aerial vehicle landing area to enhance and improve the landing zone.

Implementations consistent with the present disclosure provide an aerial vehicle aide attachment device. The attachment device includes a housing, a mounting plate configured to permit attachment to an aerial vehicle, a rotation section configured to rotate at least one element within the housing, a distance measurement device coupled to the rotation section and configured to obtain a distance from the attachment device to a surface, a processor configured to obtain the distance from the attachment device to the surface and to obtain sensor data corresponding to altitude of the attachment device or an aerial vehicle attached thereto, the processor configured to determine an angle incident with respect to vertical based at least in part upon the distance from the attachment device to the surface and the altitude, a motor, a pivot coupled to the distance measurement device and to the rotation section, and an adjustment mechanism coupled to the motor and in contact with the measurement device, the adjustment mechanism configured to adjust an angle of the distance measurement device at least in part according to the angle incident with respect to vertical.

According to an aspect of the present disclosure, provided is an aerial vehicle. The aerial vehicle includes an aerial vehicle body, and an aerial vehicle aide attachment device. The aerial vehicle aide attachment device includes a housing, a mounting plate configured to permit attachment to an aerial vehicle, a rotation section configured to rotate at least one element within the housing, a distance measurement device coupled to the rotation section and configured to obtain a distance from the attachment device to a surface, a processor configured to obtain the distance from the attachment device to the surface and to obtain sensor data corresponding to altitude of the attachment device or an aerial vehicle attached thereto, the processor configured to determine an angle incident with respect to vertical based at least in part upon the distance from the attachment device to the surface and the altitude, a motor, a pivot coupled to the distance measurement device and to the rotation section, and an adjustment mechanism coupled to the motor and in contact with the measurement device, the adjustment mechanism configured to adjust an angle of the distance measurement device at least in part according to the angle incident with respect to vertical.

A further aspect of the present disclosure provides a method for providing improved landing of aerial vehicles. The method includes attaching a device to an aerial vehicle, measuring a distance to a surface by a distance measurement device of the device, obtaining an altitude measurement of the device or the aerial vehicle, determining an angle incident relative to vertical based at least in part upon the distance to surface and the altitude measurement, adjusting a position or orientation of the distance measurement device according to the determined angle incident relative to vertical, and determining a safe landing status based at least in part upon the adjusted position or orientation of the distance measurement device.

As used herein, the term "electronic device" or "device" may refer to an electrical system including, but not limited to, one or more passive electrical components such as resistors, capacitors, and inductors, as well as active electrical components such as microprocessors, environmental sensors, diodes, etc. The electrical system may include a regulated power supply to power the system. One or more components of the electrical system may be enclosed in a chassis and/or housing for functionality and environmental protection. The housing may optionally be colored a particular way to aide in the devices purpose for enhanced safety of landing. The terms "land" or "landing" may refer to an aerial vehicle physically setting on a surface such as, but not limited to, the Earth, a building top, a street surface, a gravel bed, etc.

Implementations consistent with the present disclosure may feature an attachment mechanism to an aerial vehicle. The device may include a distance measurement device, or multiple distance sensors, and an atmospheric pressure sensor. The device may include mechanical methods to physically move the distance measurement device in an angle incident to vertical. The device may include a direct connection and/or an optional wireless connection for exporting data collected. The device may include optics which allow the diversion of the optical path of the distance measurement device. The device may include one or more electronics to control sensors, power flow, and one or more aspects of system. The device may be configured to measure distances spanning the area of a landing zone for an aerial vehicle to aide in safer landing of said aerial vehicle. As a fully functioning system, one or more of the above components may work together to measure the altitude of the aerial vehicle and to scan the ground surface below the vehicle. The greater the elevation of the aerial vehicle is, the less angular distance with respect to the ground the distance measurement device needs to be positioned at, and rotated, to cover the ground area that matches a safety clearance zone for the aerial vehicle. As the aerial vehicle gets closer to the landing surface, the altitude may be constantly measured, and the angular position of the distance measurement device may be adjusted to assure constant distance measurements. Implementations consistent with the present disclosure may allow for a lower cost, simplified, system to aide in the safe landing of an aerial vehicle.

Numerous other objects, features, and advantages of the present invention will be readily apparent to those skilled in the art upon a reading of the following disclosure when taken in conjunction with the accompanying drawings.

DETAILED DESCRIPTION

Figure 1:
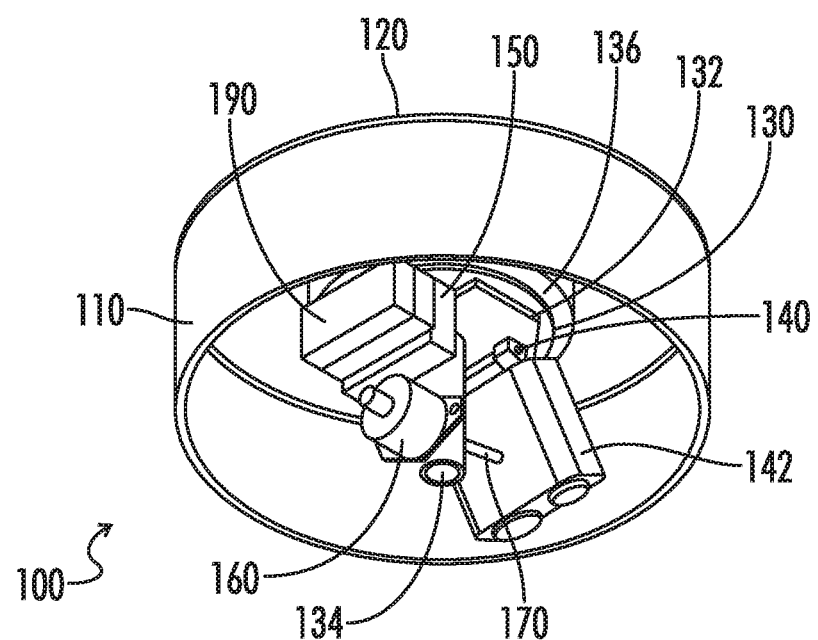
FIG. 1 illustrates a bottom side perspective view of an exemplary embodiment of a device for assisting landing of an aerial vehicle according to aspects of the present disclosure.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-7, various exemplary apparatuses, systems, and methods according to the present disclosure are described in detail. Where the various figures may describe embodiments sharing various common elements and features with other embodiments, similar elements and features are given the same reference numerals and redundant description thereof may be omitted below.

Various embodiments of an apparatus according to the present invention may provide FIG. 1 illustrates a bottom side perspective view of an exemplary embodiment of a device for assisting landing of an aerial vehicle according to aspects of the present disclosure. The device 100 may include one or more of a housing 110, a mounting plate 120, a rotation section 130, a distance measurement device 140, a power source 150, a motor 160, an adjustment mechanism 170, a lens 180 (as illustrated and described, for example, with reference to FIG. 2), and/or a circuit 190. At least a portion of the device 100 may be enclosed by or otherwise within a section of the housing 110. The device 100 may include a mounting plate 120. The mounting plate 120 is optionally formed as part of the housing at an outer surface thereof. Additionally or alternatively, at least a portion of the mounting plate 120 may be coupleable to the housing 110 in various embodiments. A lens 180, as illustrated for example by FIG. 2, may be connected to or otherwise couple to the housing 110 and/or may be of a part of the housing 110 to enclose at least a portion of one or more components of the device 100.

The rotation section 130 of the device 100 includes one or more of a rotation base 132, a pivot shaft 134, and a rotation mechanism 136. The rotation base 132 is coupleable to one or more of the rotation mechanism 136 and housing 110. The rotation section 130 further includes a pivot shaft 134. Although described with reference to pivoting and a shaft, it should be appreciated that the pivot shaft 134 may include any means of rotating, transporting, or adjusting one or more components of the device 100, such as the distance measurement device 140. The pivot shaft 134 is coupled to or coupleable with the rotation section 130, for example at the rotation base 132. The pivot shaft 134 may be configured to rotate according to an output of the rotation mechanism 136. In various embodiments, the pivot shaft 134 may be coupled to the rotation base 132 and thus configured to rotate at a same rate as the rotation base. In this configuration, the adjustment mechanism 170 may remain in contact with the distance measurement device 140 and thus able to adjust a position and/or orientation of the distance measurement device 140 even while each of the adjustment mechanism 170 and the distance measurement device are rotating within the housing 110. At least a portion of the adjustment mechanism 170 may extend through at least a portion of the pivot shaft 134.

The rotation mechanism 136 may be a motor, such as a stepper motor. The rotation mechanism 136 is a hollow shaft stepping motor in various embodiments. The distance measurement device 140 may be coupleable to the rotation section 130, for example at a pivot point 142 extending outwardly from a surface of the rotation base 132 thereof. The distance measurement device 140 may be a laser rangefinder in an exemplary embodiment, although any device capable of measuring a physical distance may be used, for example an optical distance sensor, an ultrasonic sensor, etc. One or more of the components of the device 100 may be fixedly coupled to a surface of the rotation base 132 in various embodiments and configured to rotate within the housing 110 according to an output of the rotation mechanism 136.

A position or orientation of the distance measurement device 140 may be manipulated, at least in part, using the adjustment mechanism 170. The adjustment mechanism 170 may be a tilt leadscrew capable of being placed in contact with at least a portion of the distance measurement device 140 or element coupled thereto to adjust a position or orientation of the distance measurement device 140. For example, the adjustment mechanism 170 may be of used to adjust a viewing angle of the distance measurement device 140. At least one operation of the adjustment mechanism 170 may be controlled using the motor 160. The motor 160 is configured to control the adjustment mechanism at least in part to adjust the position or orientation of the distance measurement device 140, for example by moving a position or extension of the adjustment mechanism 170. The motor 160 is a linear motor (e.g., a Haydon Kerk linear motor) in some embodiments, although any element capable of manipulating a size, shape, or position of the adjustment mechanism 170 may be used. The device 100 may include a circuit 190 configured to perform at least one operation corresponding to the device 100 or component thereof.

At least one element of the device 100 may be coupled to or coupleable with the circuit 190 via one or more wired or wireless communication mediums. Although illustrated as being within the housing 110 of the device 100 it should be appreciated that the circuit 190 may be partially or wholly physically or virtually separate from the device 100. For example, at least a portion of the circuit 190 may be external to at least a portion of the device 100 but may be communicatively coupled to or coupleable with the device 100.

Figure 2:
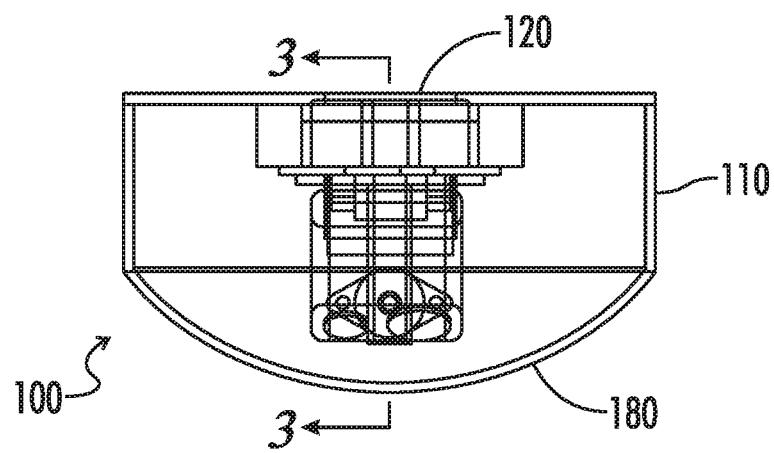
FIG. 2 illustrates a partial transparent side view an exemplary embodiment of the device of FIG. 1 according to aspects of the present disclosure.
Figure 3:
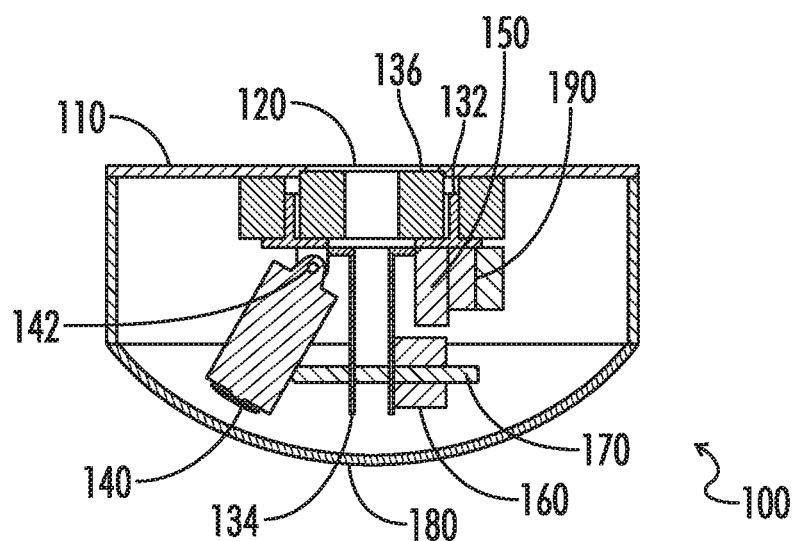
FIG. 3 illustrates the partial side cutaway view A of FIG. 2 according to aspects of the present disclosure.

FIG. 2 illustrates a partial transparent side view an exemplary embodiment of the device of FIG. 1 according to aspects of the present disclosure. The device 100 of FIG. 2 illustrates a lens 180 coupled to the housing 110. A cross section A is identified in FIG. 2, extending through a midsection of the device 100 from a mounting plate 120 thereof through the lens 180 thereof. FIG. 3 illustrates the partial side cutaway view A of FIG. 2 according to aspects of the present disclosure.

Figure 4:
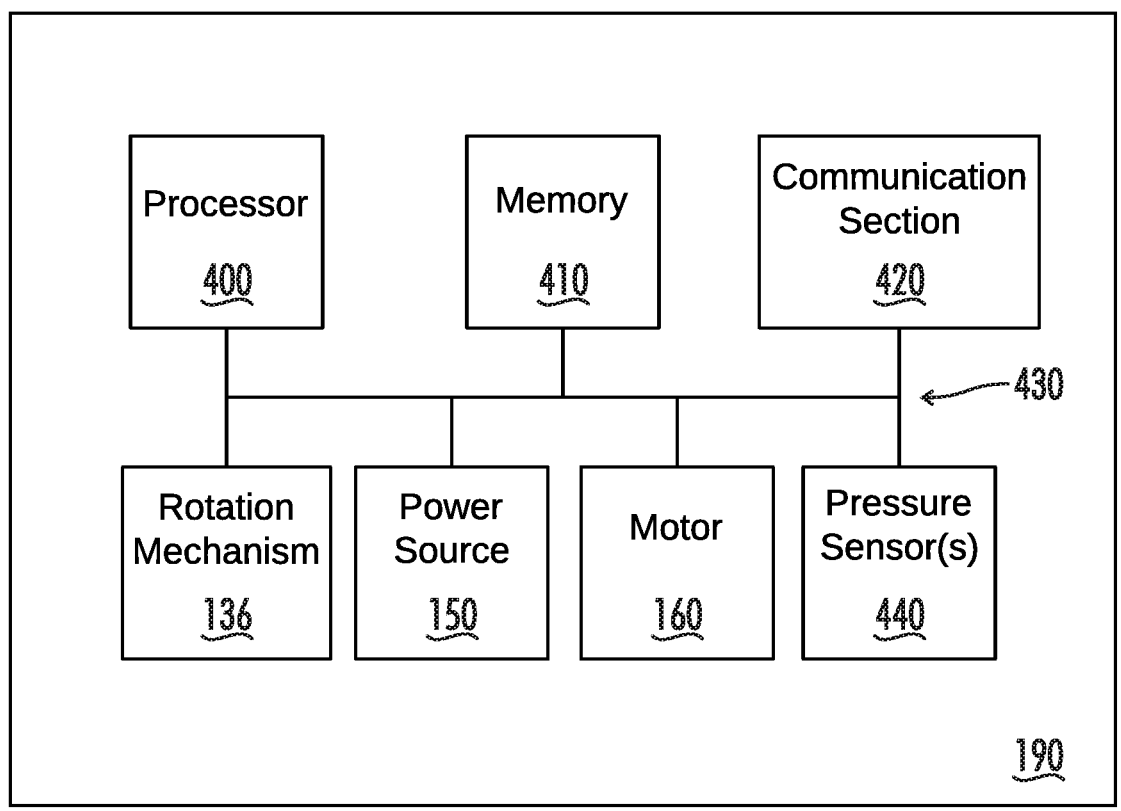
FIG. 4 illustrates a partial block diagram of an exemplary embodiment of the circuit of FIG. 1 according to aspects of the present disclosure.

FIG. 4 illustrates a partial block diagram of an exemplary embodiment of the circuit 190 of FIG. 1 according to aspects of the present disclosure. The circuit 190 includes one or more of a processor 400, a memory 410, a communication section 420, a rotation mechanism 136, a power source 150, and/or a motor 160 optionally coupled to at least one other element via a bus 430. The processor 400 may be a generic hardware processor, a special-purpose hardware processor, a virtual processor, or any combination thereof. In embodiments having a generic hardware processor (e.g., as a central processing unit (CPU) available from manufacturers such as Intel and AMD), the generic hardware processor is configured to be converted to a special-purpose processor by means of being programmed to execute and/or by executing a particular algorithm in the manner discussed herein for providing a specific operation or result.

The memory 410 may be a physical and/or virtual memory residing within the housing 110 of device 100, may be external to the device 100 but communicatively coupleable to the device 100 (e.g., via the communication section 420), or any combination thereof. For example, the memory 410 may be a local memory, a distributed storage element, a cloud storage element, or any other system for permitting storage and retrieval of at least one set of data. The memory 410 may be or otherwise include a non-transitory computer readable medium in one embodiment, encoded with one or more instructions which, when executed by the processor 400, may cause the device 100 to perform one or more operations as described herein.

The term "computer-readable memory medium" as used herein may refer to any medium alone or as one of a plurality of memory media having processor-executable software, instructions or program modules which upon execution may provide data or otherwise cause a computer system to implement subject matter or otherwise operate in a specific manner as further defined herein.

It may further be understood that more than one type of memory media consistent with the memory 410 may be used in combination to conduct processor-executable software, instructions or program modules from a first memory medium upon which the software, instructions or program modules initially reside to a processor for execution. "Memory media" may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The communication section 420 is configured to transmit and/or to receive information from one or more elements external to the device 100. The communication section 420 may be configured to communicate via one or more wired or wireless communication links and/or protocols. The communication section 420 may be configured to transmit and/or to receive operation or command information, data used by or regarding the device 100 or component thereof, and/or any other set of information or subset thereof relating to the device 100 and/or at least one element communicatively coupleable with the device via the communication section 420. The communication section 420 may include a wireless communication interface. The power source 150 may be configured to provide operating power to one or more components of the circuit 190, for example via the bus 430. The rotation mechanism 136 and motor 160 may be coupled to or coupleable to the processor 400, which may be configured to control at least one function thereof. In an exemplary embodiment, the processor 400 may be configured to control operations of the rotation mechanism 136 and the motor 160 according to a set of control information (e.g., stored at the memory 410).

The device 100 may include one or more pressure sensors 440 coupled to the bus 430. The pressure sensor(s) 440 may be configured to measure an atmospheric pressure at the device 100, for example, to measure an altitude of the device 100 coupled to the aerial vehicle 500. The processor 400 may be configured to use the altitude measured by the pressure sensor(s) 440 and at least one distance measured by the distance measurement device 140 to determine a landing safety condition. The landing safety condition may include, for example, an indication that an obstruction is present between the aerial vehicle 500 and the surface S, an indication that no obstruction is present between the aerial vehicle 500 and the surface S, or any other safety condition that may be determined using one or more of the distance measurement device 140 and/or pressure sensor(s) 440. The processor 400 may be configured to determine an angle scan range of the distance measurement device based at least in part upon the altitude of the aerial vehicle determined using the pressure sensor(s) 440. As the aerial vehicle 500 decreases in altitude, an angle of measurement (e.g., angle $\theta_{A1}$, $\theta_{A2}$ as illustrated and described with reference to FIGS. 5-6, also referred to herein as an angle incident to vertical axis of the pivot shaft 134) may be increased as to better measure any obstructions between the aerial vehicle 500 and surface S as illustrated and described with reference to FIGS. 5-6. Conversely, an aerial vehicle 500 at a greater altitude from a surface S needs only a smaller angular distance to inspect a landing zone. Although illustrated as being part of the device 100, it should be appreciated that the device 100 may obtain one or more pressure and/or altitude measurements from the aerial vehicle 500, by wireless and/or wired communication interface therewith. This is also true for the other components of the device 100, which may be optionally physically and/or logically located at one or more locations or interfaces, in whole or in part.

Figure 5:
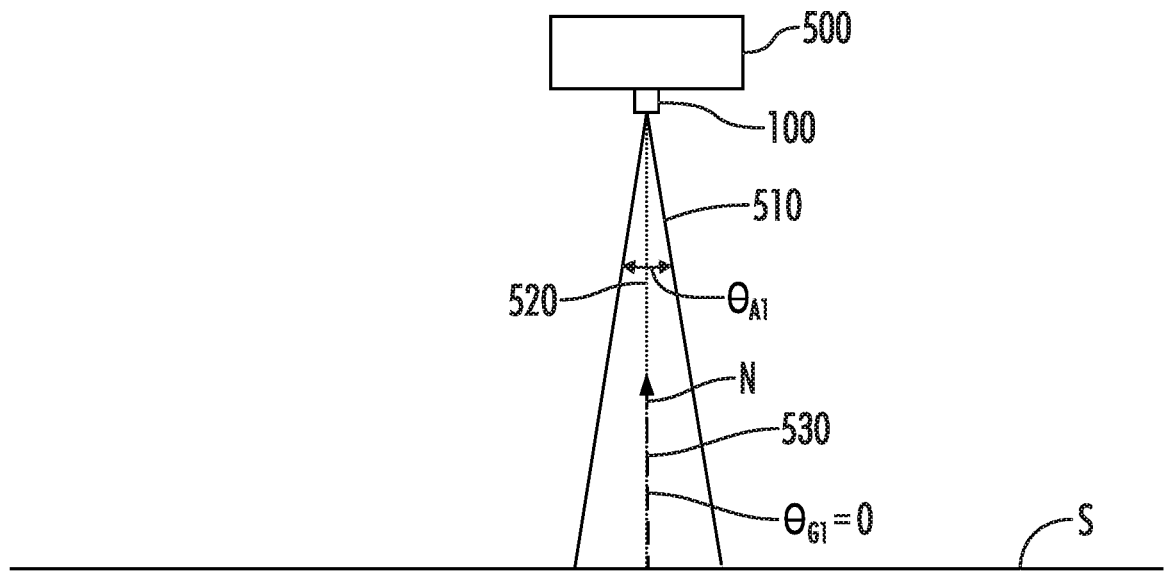
FIG. 5 illustrates a partial diagram of an exemplary embodiment of a system for providing improved landing according to aspects of the present disclosure.

FIG. 5 illustrates a partial diagram of an exemplary embodiment of a system for providing improved landing according to aspects of the present disclosure. The system includes an aerial vehicle 500 having a device 100 coupled thereto. The device 100 may be fixedly or removably coupleable to the aerial vehicle 500, for example using one or more fasteners at the mounting plate 120 of the device 100. Additionally or alternatively, at least one element for coupling the device 100 to an aerial vehicle may be part of or attachable to the aerial vehicle 500, for example as a bracket or kit for retrofitting the aerial vehicle 500 with the device 100. The distance measurement device 140 of the device 100 coupled to the aerial vehicle 500 may be configured to measure a distance to a surface S. The distance measurement device 140 may be configured to measure one or more distances within the viewing angle cone 510. For example, the device 100 may be configured to scan at least a portion of the surface S within the viewing angle cone 510 (e.g., within a range of angle $\theta_{A1}$) by adjusting at least one of a position and/or orientation of the distance measurement device 140 as described herein. The surface S within the viewing angle cone 510 may be scanned in various embodiments, for example, using a linear pattern, a zig-zag pattern, or any other pattern or sequence. The viewing angle cone 510 is a circular scan range of a surface S under the aerial vehicle 500.

Figure 6:
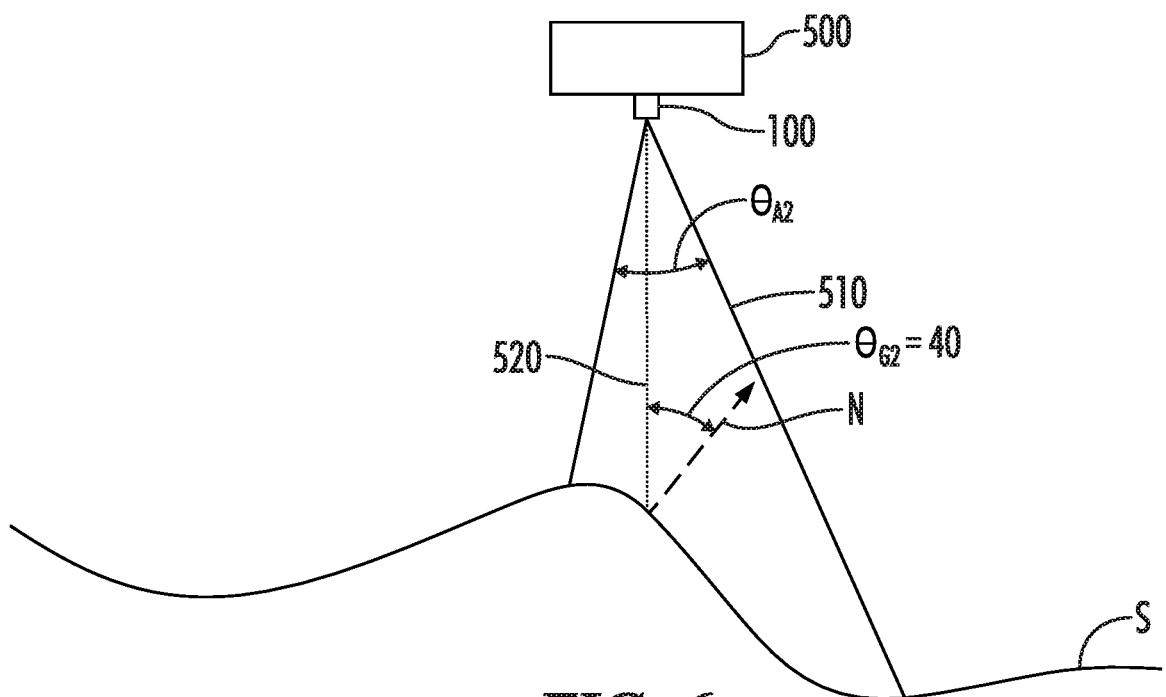
FIG. 6 illustrates a partial diagram of an exemplary embodiment of a system for providing improved landing according to aspects of the present disclosure.

The angle $\theta_{A1}$ may be an angle incident to vertical axis of the device 100. The vertical axis may be a vertical axis of the pivot shaft 134. The angle $\theta_{A1}$ may be an angle of the distance measurement device 140 from the vertical axis of the pivot shaft 134. In the illustrations of FIGS. 5-6, the viewing angle cone 510 represents a 360-degree view of the angle $\theta_{A1}$, $\theta_{A2}$ capable of use by the device 100. The device 100 may be configured to adjust a position or orientation of the distance measurement device 140 to provide a specified angle $\theta_{A1}$, $\theta_{A2}$, for example based at least in part upon an altitude of the device 100 or aerial vehicle 500, for example as determined or derived using a pressure or altitude measurement sensor of the device 100 and/or aerial vehicle 500. In embodiments having a plurality of distance measurement devices 100 associated with one or more devices 100, each of the plurality of distance measurement devices 100 may have their own associated angle $\theta_{A1}$, $\theta_{A2}$, or may additionally or alternatively share an angle $\theta_{A1}$, $\theta_{A2}$, for example where the plurality of distance measurement devices are at a same elevation or correspond to a same aerial vehicle 500.

Although described as circular, it should be appreciated that the scan range and/or shape of the viewing angle cone 510 may vary, for example based on elevation changes of the ground surface, objects within the viewing angle cone 510, etc. Put another way, although the viewing angle cone 510 provides a circular shape below the device 100, the shape of the viewing angle cone 510 incident on a surface S may be a shape other than circular. The device 100 may determine a vertical-to-normal angle $\theta_{G1}$ between the vertical axis 520 corresponding to the pivot shaft 134 and the normal of the surface S. The device 100 may be configured to determine a safety condition associated with the vertical-to-normal angle $\theta_{G1}$, such as to provide a dangerous landing condition to a pilot or operator of the aerial vehicle 500.

FIG. 6 illustrates a partial diagram of an exemplary embodiment of a system for providing improved landing according to aspects of the present disclosure. The distance measurement device 140 of the device 100 coupled to the aerial vehicle 500 may be configured to measure a distance to a surface S. The surface S of FIG. 6 is provided with varying slope across the area within the viewing angle cone 510 within the range of angle $\theta_{A2}$. For example, a distance from the device 100 to the surface S at the right side of the viewing angle cone 510 is greater than a distance from the device 100 to the surface S at the left side of the viewing angle cone 510. In various embodiments, the device 100 is capable of measuring or otherwise determining a normal of the surface S. The device 100 may determine a vertical-to-normal angle $\theta_{G2}$ between the vertical axis 520 and the normal of the surface S. The device 100 may be configured to determine a safety condition associated with the vertical-to-normal angle $\theta_{G2}$, such as to provide a dangerous landing condition to a pilot or operator of the aerial vehicle 500. For example, the angle of 40 degrees in FIG. 6 might exceed a safe landing angle value which may be predetermined or dynamically determined, for example using a rate of descent, a characteristic of the aerial vehicle 500, or any other set of information about the surface S and/or aerial vehicle 500. Additionally or alternatively, the device 100 may be configured to scan within at least a portion of the viewing angle cone 510 to determine an optimal or preferred landing area and to selectively convey an indication of the optimal or preferred landing area, for example to a pilot or operator of the aerial vehicle 500.

Figure 7:
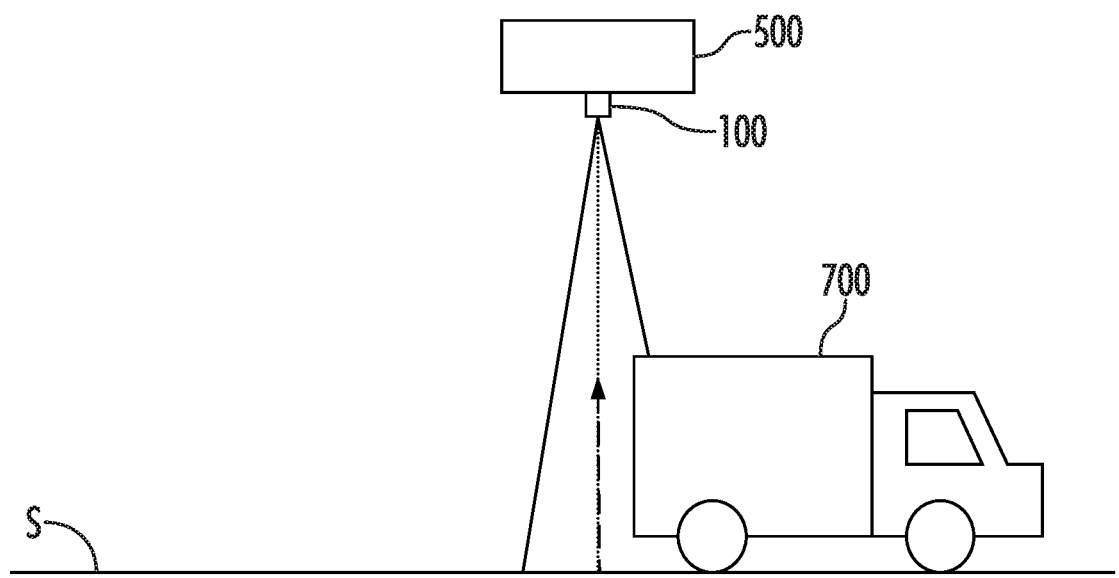
FIG. 7 illustrates a partial diagram of an obstruction in a landing area according to aspects of the present disclosure.

FIG. 7 illustrates a partial diagram of an obstruction in a landing area according to aspects of the present disclosure. An obstruction 700 is within the viewing angle cone 510 of the device 100 of the aerial vehicle 500. Although illustrated as a ground vehicle, it should be appreciated that the obstruction 700 may be any object above or part of the surface S that might obstruct a landing of the aerial vehicle 500. The obstruction 700 may be detected based at least in part upon a distance measurement of the distance measurement device 140 of the device 100. The device 100 may determine and/or suggest a modified landing area or location based at least in part upon detection of an obstruction 700 between the aerial vehicle 500 and surface S. The device 100 may be configured to operate in real-time to monitor a status of the obstruction 700. For example, if an obstruction 700 is detected and may be moved, the device 100 may be capable of detecting an initial unsafe landing condition based on the presence of the obstruction 700, then may be capable of detecting that the obstruction 700 is no longer a safety threat (e.g., when it is moved away from the landing area) and may be capable of informing a pilot or operator of the aerial vehicle 500 that the initial unsafe landing condition has been cleared or that there are now no landing safety concerns detected.

At least one component described herein may be fixedly or removably attached to or otherwise attachable to the mounting plate 120. The device 100 may be attached to an aerial vehicle 500 through a mechanical means for example, but not limited to, using bolt connections through the mounting plate 120 to the aerial vehicle 500. At least one bearing may be used with the housing 110. These bearings and housing 110 allow for a 360-degree rotation, about the horizontal plane, of one or more components of the device 100. The rotation base 132 may be a physical part which the lower portion of the device 100 attaches to in order to rotate about the horizontal plane. The pivot shaft 134 may be a vertical point of reference for which the distance measurement device 140 is angled. The distance measurement device 140 may be a laser rangefinder in various embodiments. The power source 150 may be a battery. The power source 150 may provide power to one or more components of the device 100 such that it can be used as a stand-alone device. Motor 160 may be a Haydon Kerk linear motor. The motor 160 may rotate a shaft to adjust the distance measurement device 140 with respect to the pivot (e.g., pivot 142 functioning as a pivot point). At this pivot 142, the distance measurement device 140 is secured in various embodiments. The pivot 142 allows for angular positioning with respect to pivot shaft 134. Rotation mechanism 136 may include a stepper motor and shaft. The rotation mechanism 136 motor may allow for rotation base 132 to move 360 degrees about the horizontal plane. This rotation allows for the distance measurement device 140 to scan a circular area below the aerial vehicle 500 at whatever current angular position it is oriented in. Adjustment mechanism 170 may be a main screw. After altitude is measured (e.g., via at least one pressure sensor), one or more components of the circuit 190 of the device 100 may determine how far the adjustment mechanism 170 needs to be turned by the motor 160, either forward or backwards, to set the angular position of the distance measurement device 140. Lens 180 may be a window or covering to environmentally protect the device 100 from external weather conditions. Circuit 190 may be single or multiple board system, configured to read the sensor data, to control motor positions, and to report data back to the aerial vehicle 500 (e.g., via the communication section 420. Pivot 142 refers to the pivot point of the distance measurement device 140. This pivot point allows for an angular position setting of the distance measurement device 140 to be modified with respect to a vertical reference, for example based upon an extension amount of the adjustment mechanism 170.

The device 100 may be an aerial vehicle aide attachment device, coupleable to an aerial vehicle. The device 100 or element thereof, such as the housing 110, may be formed of an environmental resistant housing material, for example capable of keeping moisture, dust, high or low temperatures, away from an interior space of the device 100 or at the least resisting the impact of one or more environmental elements or exterior element. The device 100 may be coupled to or coupleable to the aerial vehicle 500 at a mounting plate 120 thereof. Additionally or alternatively, at least one component of the mounting plate 120 may be a part of the aerial vehicle 500 and/or may be an intermediary element, such as a bracket or other component between the aerial vehicle 500 and device 100. The device 100 may include one or more mechanical rotation elements for rotating about the horizontal plane (e.g., one or more of the housing 110, the rotation base 132, and/or the rotation mechanism 136 described herein). A distance measurement device 140 of the device 100 may be configured to measure a distance from the device 100 to a surface S below the device 100. The device 100 may include an altitude measurement device, such as pressure sensor(s) 440. Additionally or alternatively, at least one altitude sensor may be included as part of the aerial vehicle 500 and the device 100 may be configured to obtain or otherwise access altitude data from the aerial vehicle 500 directly and/or indirectly, for example using a wireless or wired connection via the communication section 420 and obtaining the altitude data or data capable of determining an altitude from an electronic system of the aerial vehicle 500. The processor 400 is capable of synchronizing atmospheric pressure sensor data (e.g., altitude data) with distance data obtained by the distance measurement device 140.

The pivot shaft 134 may be used as a vertical position reference for the distance measurement device 140. A physical incident angle with respect to vertical of the distance measurement device 140 may be mechanically set using one or more of the pivot shaft 134, the motor 160, the adjustment mechanism 170, and/or the pivot 142. The pivot 142 may function as a pivot of the distance measurement device 140. A physical position of the aerial vehicle 500 may be measured, for example, using an accelerometer with respect to a standard three planed-axis, commonly referred to as pitch, roll, and yaw. The processor 400 may be configured to calculate a vertical angle relative to the device 100. The communication section 402 may be configured to communicate with the aerial vehicle 500 and/or an app executable by an electronic device such as a mobile phone or tablet. Additionally or alternatively, the communication section 420 of the device 100 may be configured to communicate with the aerial vehicle 500 via one or more wired communication interfaces. The circuit 190 may be configured to manage battery use, to control sensors, to control mechanical movements, and to transmit and receive data with the aerial vehicle 500. An aperture window such as the lens 180 may enable viewing the outside environment form the inside of the housing 110 of the device 100. One or more mechanical motors may be used by the device 100 to permit movement of one or more sensors of the types described herein.

The device 100 may be permanently attached to an aerial vehicle 500 by mechanical means of one or more fastening elements, such as screws or bolts. The device 100 may be permanently attached to an aerial vehicle 500 using a glue, an epoxy, or any other type of adhesive. The processor 400 may determine a vertical oriented incident angle of the distance measurement device 140 based at least in part upon an atmospheric pressure measurement. The atmospheric pressure measurement may be obtained using a pressure sensor of the device 100. The distance measurement device 140 may be a distance sensor, such as a laser rangefinder or any other sensor capable of determining a point-to-point distance. The device 100 and/or one or more components thereof may be capable of mechanically rotating 360 degrees about the horizontal (e.g., longitudinal) plane. The device 100 may include one or more of an accelerometer, a temperature sensor, a microprocessor (e.g., processor 400), and/or a battery control circuit (e.g., one or more of power source 150 and/or circuit 190). The device 100 may include a mechanical pivot point (e.g., pivot 142) coupled to or coupleable with the distance measurement device 140. The device 100 may include one or more motors, such as a stepper motor, or any other form of motor or element capable of providing or enabling motion or action. The device may include a power source 150, such as a battery power supply.

The device 100 may include auxiliary wiring for coupling to a power source external to the device 100. Additionally or alternatively, the device 100 may include an auxiliary wiring capable of coupling to an aerial vehicle for obtaining one or more data values output by the aerial vehicle 500. The communication section 420 of the device 100 may include wireless capability for data output and input including, but not limited to, radio frequency (RF), Bluetooth, Bluetooth Low Energy, WiFi, pulse light, or any other wireless communication medium, protocol, or interface. At least a portion of the device 100, such as the housing 110 and/or lens 180 may be painted, stained, colored, or patterned to match a color of the aerial vehicle 500. Additionally or alternatively, at least a portion of the device 100, such as the housing 110 and/or lens 180 may be painted, stained, colored, or patterned to match a color of the sky or night. The device 100 may include one or more light emitting diode (LED) lights, at an interior or exterior surface thereof. The device 100 may include an auditory alert method including, but not limited to, a speaker, a buzzer, a horn, and/or a piezoelectric device. The device 100 may optionally include at least one aperture between an interior space of the device 100 and area external to the device 100 (e.g., the outside environment). The device 100 or portion thereof may be offset from the horizontal plane for aiding non-vertical landing paths. Two or more devices 100 may be paired with one another in various embodiments. The device 100 may use optics, such as one or more mirrors, to divert an overall measurement angle of the distance measurement device 140.

The device 100 may be configured to used with one or more aerial vehicles 500 including, but not limited to, helicopters, drones, unmanned aerial vehicles (UAVs), blimps, and/or hot air balloons. The device 100 may read the altitude of the aerial vehicle 500 directly from one or more sensors of the aerial vehicle 500. The device may receive at least one set of data transmitted from the aerial vehicle 500. The device 100 may be configured to communicate with at least one electronic device, such as a mobile device, a cellular device, a tablet, etc.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An aerial vehicle aide attachment device, comprising:
    a housing;
    a mounting plate configured to permit attachment to an aerial vehicle;
    a rotation section configured to rotate at least one element within the housing;
    a distance measurement device coupled to the rotation section and configured to obtain a distance from the attachment device to a surface;
    a processor configured to obtain the distance from the attachment device to the surface and to obtain sensor data corresponding to altitude of the attachment device or an aerial vehicle attached thereto, the processor configured to determine an angle incident with respect to vertical based at least in part upon the distance from the attachment device to the surface and the altitude;
    a motor;
    a pivot coupled to the distance measurement device and to the rotation section; and
    an adjustment mechanism coupled to the motor and in contact with the measurement device, the adjustment mechanism configured to adjust an angle of the distance measurement device at least in part according to the angle incident with respect to vertical.

2. The device of claim 1, wherein the attachment device is configured to be coupled to a helicopter, a drone, an unmanned aerial vehicle (UAV), a blimp, or a hot air balloon.

3. The device of claim 1, further comprising a communication section configured to communicate with the aerial vehicle using a wired or wireless connection.

4. The device of claim 3, wherein the processor is configured to receive the sensor data corresponding to the altitude of the attachment device or aerial vehicle from the aerial vehicle via the communication section.

5. The device of claim 4, wherein the communication section includes an auxiliary wiring, the auxiliary wiring configured to transfer the sensor data corresponding to the altitude of the attachment device or aerial vehicle from the aerial vehicle to the attachment device.

6. The device of claim 4, wherein the communication section includes a wireless communication interface, the wireless communication interface configured to receive the sensor data corresponding to the altitude of the attachment device or aerial vehicle from the aerial vehicle from the aerial vehicle.

7. The device of claim 1, wherein the rotation section includes a rotation base, a pivot shaft, and a rotation mechanism.

8. The device of claim 7, wherein the angle incident to vertical is measured relative to a vertical axis of the pivot shaft.

9. The device of claim 1, further comprising a pressure sensor, wherein the processor is configured to receive the sensor data corresponding to altitude of the attachment device or aerial vehicle from the pressure sensor.

10. An aerial vehicle, comprising:
    an aerial vehicle body; and
    an aerial vehicle aide attachment device, comprising:
        a housing;

a mounting plate configured to permit attachment to an aerial vehicle;

a rotation section configured to rotate at least one element within the housing;

a distance measurement device coupled to the rotation section and configured to obtain a distance from the attachment device to a surface;

a processor configured to obtain the distance from the attachment device to the surface and to obtain sensor data corresponding to altitude of the attachment device or an aerial vehicle attached thereto, the processor configured to determine an angle incident with respect to vertical based at least in part upon the distance from the attachment device to the surface and the altitude;

a motor;

a pivot coupled to the distance measurement device and to the rotation section; and an adjustment mechanism coupled to the motor and in contact with the measurement device, the adjustment mechanism configured to adjust an angle of the distance measurement device at least in part according to the angle incident with respect to vertical.

11. The aerial vehicle of claim 10, wherein the aerial vehicle is a helicopter, a drone, an unmanned aerial vehicle (UAV), a blimp, or a hot air balloon.

12. The aerial vehicle of claim 10, wherein the attachment device includes a communication section configured to communicate with the aerial vehicle using a wired or wireless connection.

13. The aerial vehicle of claim 10, further comprising a pressure sensor, wherein the processor of the attachment device is configured to receive the sensor data corresponding to altitude of the attachment device or aerial vehicle from the pressure sensor.

14. The aerial vehicle of claim 10, wherein the attachment device includes a further comprising a communication section configured to communicate with the aerial vehicle using a wired or wireless connection, the communication section having an auxiliary wiring, the auxiliary wiring configured to transfer the sensor data corresponding to the altitude of the attachment device or aerial vehicle from the aerial vehicle to the attachment device.

15. The aerial vehicle of claim 10, further comprising an alert device, the alert device comprising at least one of a speaker, a buzzer, a horn, or a piezoelectric device.

16. A method for providing improved landing of aerial vehicles, comprising: attaching a device to an aerial vehicle; measuring a distance to a surface by a distance measurement device of the device; obtaining an altitude measurement of the device or the aerial vehicle; determining an angle incident relative to vertical based at least in part upon the distance to surface and the altitude measurement; adjusting a position or orientation of the distance measurement device according to the determined angle incident relative to vertical; and determining a safe landing status based at least in part upon the adjusted position or orientation of the distance measurement device, wherein the determining the angle incident relative to vertical based at least in part upon the distance to surface and the altitude measurement comprises determining an angle relative to a vertical axis associated with a pivot shaft of the device.

17. The method of claim 16, wherein the obtaining the altitude measurement comprises obtaining a sensor value from a pressure sensor and determining an altitude based at least in part upon the sensor value.

18. The method of claim 16, wherein the attaching a device to an aerial vehicle comprises retrofitting and existing aerial vehicle with the device.

19. The Method of claim 16, wherein the adjusting the position or orientation of the distance measurement device according to the determined angle incident relative to vertical comprises manipulating a position of an adjustment mechanism of the device based at least in part upon the determined angle incident relative to vertical.

\* \* \* \* \*